United States Patent [19]

Staiger

[11] Patent Number: 4,526,944
[45] Date of Patent: * Jul. 2, 1985

[54] PREPARATION OF α-MONOOLEFIN HOMOPOLYMERS AND COPOLYMERS

[75] Inventor: Gerhard Staiger, Bobenheim-Roxheim, Fed. Rep. of Germany

[73] Assignee: BASF Aktiengesellschaft, Fed. Rep. of Germany

[*] Notice: The portion of the term of this patent subsequent to Apr. 7, 1998 has been disclaimed.

[21] Appl. No.: 240,103

[22] Filed: Mar. 3, 1981

[30] Foreign Application Priority Data

Mar. 22, 1980 [DE] Fed. Rep. of Germany ....... 3011236

[51] Int. Cl.$^3$ .......................... C08F 4/64; C08F 10/00
[52] U.S. Cl. .................................. 526/142; 502/127; 526/351; 526/906
[58] Field of Search ......................................... 526/142

[56] References Cited

U.S. PATENT DOCUMENTS 4,154,699 5/1979 Mueller-Tamm et al. ......... 526/142
4,260,710 4/1981 Staiger et al. ...................... 526/142

FOREIGN PATENT DOCUMENTS 2658939 7/1978 Fed. Rep. of Germany .

Primary Examiner—Edward J. Smith
Attorney, Agent, or Firm—Keil & Weinkauf

[57] ABSTRACT

A process for the preparation of homopolymers and copolymers of α-monoolefins by means of a Ziegler-Natta catalyst system comprising (1) a halide of trivalent titanium, (2) an oxygen compound (ester) having a specific formula and (3) an aluminum-alkyl, the titanium halide (1) and the oxygen compound (2) being milled together before use, wherein the catalyst system employed contains, as a further component, (4) a phenolic compound of the formula

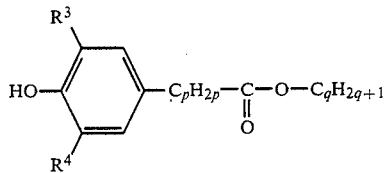

where $R^3$ is $C_1$–$C_6$-alkyl, $R^4$ is hydrogen or $C_1$–$C_6$-alkyl, p is an integer from 0 to 5 and q is an integer from 1 to 5.

2 Claims, No Drawings

PREPARATION OF α-MONOOLEFIN HOMOPOLYMERS AND COPOLYMERS

The present invention relates to a process for the preparation of homopolymers and copolymers of $C_2$–$C_6$-α-monoolefins at from 20° to 160° C., especially from 50° to 120° C., under a pressure of from 1 to 100 bar, especially from 20 to 70 bar, by means of a Ziegler-Natta catalyst system comprising (1) a titanium halide of the formula

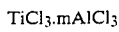

$TiCl_3 \cdot mAlCl_3$ where m is from 0 to 0.5, especially from 0.1 to 0.4, (2) an oxygen compound of the formula

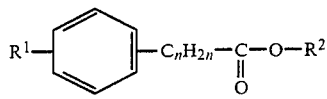

where
$R^1$ is hydrogen, $C_1$–$C_4$-alkyl or $C_1$–$C_4$-alkoxy, preferably hydrogen or $C_1$–$C_2$-alkyl, and especially hydrogen,
$R^2$ is $C_1$–$C_4$-alkyl, especially ethyl, and
n is an integer from 0 to 3, especially 1,
and
(3) an aluminum-alkyl of the formula

where
X and Y are each alkyl of not more than 8, especially not more than 2, carbon atoms and
Z is chlorine or alkyl of not more than 8, especially not more than 2, carbon atoms,
with the proviso that (I) the molar ratio of titanium halide (1):oxygen compound (2) is from 1:1 to 20:1, especially from 3:1 to 6:1, (II) the molar ratio of titanium halide (1):aluminum-alkyl (3) is from 1:1 to 1:20, especially from 1:2 to 1:15, and (III) the titanium halide (1) and the oxygen compound (2) have been milled together before use.

Processes of this type are known; their special feature relative to other, comparable processes is the specific embodiment of the catalyst system, a typical example being German Laid-Open Application DOS 2,658,939.

The specific embodiments of the catalyst system are aimed at achieving particular objectives, for example the following:

(a) Catalyst systems which, in the polymerization of α-monoolefins, especially propylene, give polymers with a high proportion of stereoregular (=isotactic) material.

(b) Catalyst systems which can give an increased yield of polymer, namely systems which have a higher productivity, i.e. systems in which the amount of polymer formed per unit weight of catalyst system is increased.

(c) Catalyst systems by means of which less halogen is introduced into the polymer, this being achievable by increasing the yield as in (b) and/or by employing a titanium halide which contains very little halogen.

(d) Catalyst systems whose maximum activity remains constant or relatively constant over a very long period, this being of great importance for the catalyst yield.

(e) Catalyst systems with which an increase in conversion can be achieved by raising the polymerization temperature, without significant reduction in the stereoregularity of the polymers, such increase being generally desirable, especially in dry phase polymerization.

(f) Catalyst systems by means of which the morphological properties of the polymers are influenced in a certain way, especially at relatively high polymerization temperatures, for example in the sense of giving a uniform particle size and/or reducing the proportion of fines and/or giving a high bulk density; this can be of importance in, for example, the technical control of polymerization systems, in the working up of the polymers and/or in respect of the processability of the polymers.

(g) Catalyst systems which are simple and safe to prepare and easy to handle, for example systems which can be prepared in (inert) hydrocarbon auxiliary media.

(h) Catalyst systems which make it possible, where the polymerization is carried out using a molecular weight regulator, especially hydrogen, to manage with relatively small amounts of such a regulator; this can, for example, be important as regards the thermodynamics of the process.

(i) Catalyst systems which are tailored to specific polymerization processes, for example those intended to suit either the specific peculiarities of suspension polymerization or the specific peculiarities of dry phase polymerization.

(j) Catalyst systems which give polymers whose spectrum of properties makes them particularly suitable for one or other application.

According to experience gathered hitherto, there are, amongst these numerous objectives, some which can only be achieved by special embodiments of the catalyst system if other objectives are lowered.

Under these circumstances, the endeavor is generally to find embodiments with which not only the particular objectives are achieved but other desired objectives need be lowered as little as possible.

The present invention also conforms to this pattern. Its object is to provide a novel embodiment of a catalyst system, with which better results can be achieved, for similar objectives, than with conventional embodiments.

I have found that this object is achieved with a catalyst system of the initially defined type, which contains, as a further component, (4) a specific phenolic compound.

Accordingly, the present invention relates to a process for the preparation of homopolymers and copolymers of $C_2$–$C_6$-α-monoolefins at from 20° to 160° C., especially from 50° to 120° C., under a pressure of from 1 to 100 bar, especially from 20 to 70 bar, by means of a Ziegler-Natta catalyst system comprising (1) a titanium halide of the formula

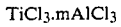

$TiCl_3 \cdot mAlCl_3$ where m is from 0 to 0.5, especially from 0.1 to 0.4, (2) an oxygen compound of the formula

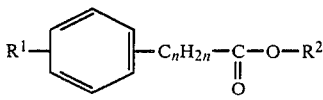

where
R¹ is hydrogen, $C_1$–$C_4$-alkyl or $C_1$–$C_4$-alkoxy, preferably hydrogen or $C_1$–$C_2$-alkyl, and especially hydrogen,
R² is $C_1$–$C_4$-alkyl, especially ethyl, and
n is an integer from 0 to 3, especially 1,
and
(3) an aluminum-alkyl of the formula

where
X and Y are each alkyl of not more than 8, especially not more than 2, carbon atoms and
Z is chlorine or alkyl of not more than 8, especially not more than 2, carbon atoms, with the proviso that (I) the molar ratio of titanium halide (1):oxygen compound (2) is from 1:1 to 20:1, especially from 3:1 to 6:1, (II) the molar ratio of titanium halide (1):aluminum-alkyl (3) is from 1:1 to 1:20, especially from 1:2 to 1:15, and (III) the titanium halide (1) and the oxygen compound (2) have been milled together before use, in which process the catalyst system employed contains, as a further component (4) a phenolic compound of the formula

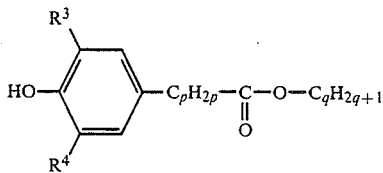

where
R³ is $C_1$–$C_6$-alkyl, especially $C_3$–$C_4$-alkyl,
R⁴ is hydrogen or $C_1$–$C_6$-alkyl, especially $C_3$–$C_4$-alkyl,
p is an integer from 0 to 5, especially from 1 to 4 and
q is an integer from 1 to 5, especially from 1 to 3,
with the proviso that the molar ratio of aluminum-alkyl (3):phenolic compound (4) is from 1:1 to 40:1, especially from 3:1 to 25:1.

The following details may be noted concerning the process according to the invention.

The polymerization process as such can, taking due account of its characterizing feature, be carried out in virtually all relevant conventional technological embodiments, such as a batchwise, cyclic or continuous process, which may be, for example, a suspension polymerization process, solution polymerization process or dry phase polymerization process. The technological embodiments mentioned, in other words the technological embodiments of the Ziegler-Natta polymerization of α-monoolefins, are well known from the literature and from industrial practice, so that further details are not required here.

For completeness, it should be noted that in the process according to the invention the molecular weights of the polymers can be regulated by relevant conventional measures, for example by means of regulators, especially hydrogen.

Further, it is to be noted that in the process according to the invention the components of the catalyst system can be introduced into the polymerization space in a plurality of ways, for example (i) the milled product of the titanium halide (1) and the oxygen compound (2) as one component, and the aluminum-alkyl (3) and phenolic compound (4) as two further components, all introduced at the same place, (ii) the same three components, all introduced at different places, (iii) the milled product of (1) and (2), as one component, and a mixture of (3) and (4) as the other component, at different places—which can in particular be advantageous in dry phase polymerization processes, or (iv) a mixture of the milled product of (1) and (2) and the phenolic compound (4), as one component, and aluminum-alkyl (3) as the other component, at different places.

Finally, it is to be noted that the advantageous properties of the process according to the invention in general manifest themselves particularly if the process is carried out as a dry phase polymerization (typical examples of which may be found, for example, in German Published Applications DAS 1,217,071, DAS 1,520,307 and DAS 1,520,373).

One of the measures provided in the process according to the invention is that the titanium halide (1) and the oxygen compound (2) have been milled together before use. This milling can also be carried out in a relevant conventional manner, most simply by, for example, treating the two components together in a vibratory mill, especially a vibratory ball mill, for a period of from 2 to 50 hours at from 0° to 40° C., under a milling acceleration of from 30 to 80 m.sec$^{-2}$, in the presence or, preferably, the absence of diluents. However, the milling can also be carried out by special methods, for example by that described in German Laid-Open Application DOS 2,658,939, already referred to above.

As regards the materials employed in the novel catalyst system, the following may be noted.

The titanium halide (1) which is employed can be one conventionally used in Ziegler-Natta catalyst systems, for example a reaction product obtained on reducing a titanium tetrahalide with hydrogen, aluminum or an aluminum-organic compound. Examples of halides which have proved very suitable are trichlorides of the formula $TiCl_3$, as obtained on reducing titanium tetrachloride with hydrogen, and, in particular, co-crystalline materials, as obtained by co-crystallization of $TiCl_3$ and $AlCl_3$ or by reduction of $TiCl_4$ with aluminum or with mixtures of aluminum and titanium. Co-crystalline products of the formula $TiCl_3 \cdot \frac{1}{3}AlCl_3$ are particularly suitable. The relevant titanium halides (1) are commercially available, so that further details are not required here.

The oxygen compounds (2), having the formula given above, may be the relevant conventional compounds of this formula, such as those where R¹ is hydrogen, methyl, ethyl, n-propyl, n-butyl, i-propyl, i-butyl, tert.-butyl, methoxy, ethoxy, n-propoxy or n-butoxy and R² is methyl, ethyl, n-propyl, n-butyl, i-propyl, i-butyl or tert.-butyl. Typical examples of very suitable oxygen compounds (2) are the phenylacetic acid, 3-phenylpropionic acid and 4-phenylbutyric acid esters of methanol and ethanol, especially ethyl phenylacetate.

Suitable aluminum-alkyls (3) having the formula given above are, again, the relevant conventional compounds of this formula, which are so well known from the literature and from industrial practice that they do not require more detailed discussion here. Important examples include triethyl-aluminum and diethyl-aluminum chloride.

As regards the phenolic compounds (4), typical examples of suitable materials of this formula are those where $R_3$ is tert.-butyl, $R^4$ is also tert.-butyl or is hydrogen, and the groups $-C_pH_{2p}-$ and $C_qH_{2q+1}$ are straight chains.

Specific examples of very suitable compounds of the stated formula are the esters of $\beta$-(4'-hydroxy-3',5'-di-tert.-butylphenyl)-propionic acid with methanol, ethanol, n-propanol and n-butanol.

The process according to the invention allows homopolymers and copolymers of $C_2$-$C_6$-$\alpha$-monoolefins to be prepared in an advantageous manner, particularly suitable $\alpha$-monoolefins being propylene, but-1-ene and 4-methylpent-1-ene and, in the case of copolymerizations, ethylene.

EXAMPLE 1

The starting materials of the catalyst system are
(1) a titanium halide of the formula $TiCl_3 \cdot 0.33AlCl_3$,
(2) ethyl phenylacetate as the oxygen compound,
(3) diethyl-aluminum chloride as the aluminum-alkyl and
(4) the phenolic compound shown in the Table below.

Before use, the titanium halide (1) and the oxygen compound (2) are milled together, in the molar ratio of 3:1, in a vibratory ball mill for a period of 50 hours at 20° C. under a milling acceleration of 50 m.sec$^{-2}$, in the absence of a diluent.

To carry out the polymerization, 1,000 parts by weight of n-heptane are introduced into a stirred vessel, in the absence of air and moisture, after which 2.3 parts by weight of the catalyst component (3) are added, and sufficient of the milled product of components (1)+(2) that the molar ratio of titanium halide (1):aluminum-alkyl (3) is 1:2.5, as well as sufficient of the catalyst component (4) that the molar ratio of aluminum-alkyl (3):phenolic compound (4) is as shown in the Table.

The actual polymerization is carried out with propylene at 60° C. under a monomer pressure of 1 bar, for 3 hours, with stirring, after which the polypropylene formed is isolated in a conventional manner; its amount, and its content of material insoluble in boiling n-heptane, are shown in the Table.

COMPARATIVE EXPERIMENT A

The procedure followed is as described in Example 1, except that no phenolic compound is added.

The result is shown in the Table.

EXAMPLE 2

The starting materials (1), (2) and (3) of the catalyst system are the same as in Example 1, whilst starting material (4) is as shown in the Table.

To carry out the polymerization, 10,000 parts by weight of liquid propylene, 18 liters (S.T.P.) of hydrogen (as a molecular weight regulator), 1.68 parts by weight of catalyst component (3), sufficient of the milled product of components (1)+(2) that the molar ratio of titanium halide (1):aluminum-alkyl (3) is 1:7, and sufficient of the catalyst component (4) that the molar ratio of aluminum-alkyl (3):phenolic compound (4) has the value shown in the Table, are introduced into a stirred pressure vessel, in the absence of air and moisture.

The actual polymerization is carried out at 80° C. under a pressure of 38 bar for 2 hours, with stirring, after which the polypropylene formed is isolated in a conventional manner; its amount, and its content of material insoluble in boiling n-heptane, are shown in the Table.

COMPARATIVE EXPERIMENT B

The procedure followed is as described in Example 2, except that no phenolic compound is added.

The result is shown in the Table. In the Table:
MBPP = Methyl $\beta$-(4'-hydroxy-3',5'-di-tert.-butylphenyl)propionate.

TABLE

| Example or Comparative Experiment | Phenolic compounds | | Polypropylene | |
|---|---|---|---|---|
| | Type | Molar ratio (3):(4) | Parts by weight | Amount insoluble in n-$C_7H_{16}$ |
| 1 | MBPP | 5:1 | 220 | 99.2% |
| A | — | — | 188 | 98.1% |
| 2 | MBPP | 21:1 | 3700 | 97.8% |
| B | — | — | 3090 | 94.1% |

I claim:
1. A process for the preparation of homopolymers and copolymers of $C_2$-$C_6$-$\alpha$-monoolefins at from 20° to 160° C., under a pressure of from 1 to 100 bar, by means of a Ziegler-Natta catalyst system comprising

(1) a titanium halide of the formula
ti $TiCl_3 \cdot mAlCl_3$ where m is from 0 to 0.5,
(2) an oxygen compound of the formula

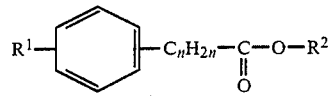

where
$R^1$ is hydrogen, $C_1$-$C_4$-alkyl or $C_1$-$C_4$-alkoxy,
$R^2$ is $C_1$-$C_4$-alkyl, and
n is an integer from 0 to 3,
and
(3) an aluminum-alkyl of the formula

where
X and Y are each alkyl of not more than 8 carbon atoms and
Z is chlorine or alkyl of not more than 8 carbon atoms, with the proviso that (I) the molar ratio of titanium halide (1):oxygen compound (2) is from 1:1 to 20:1, (II) the molar ratio of titanium halide (1):aluminum-alkyl (3) is from 1:1 to 1:20, and (III) the titanium halide (1) and the oxygen compound (2) have been milled together before use, in which process the catalyst system employed contains, as a further component
(4) a phenolic compound of the formula

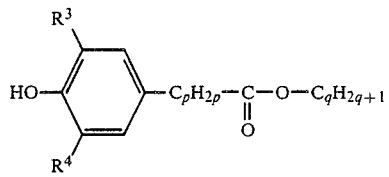
where
$R^3$ is $C_1$–$C_6$-alkyl,
$R^4$ is hydrogen or $C_1$–$C_6$-alkyl,
p is an integer from 0 to 5, and
q is an integer from 1 to 5,
with the proviso that the molar ratio of aluminum-alkyl (3):phenolic compound (4) is from 1:1 to 40:1.
2. The process of claim 1 wherein the phenolic compound is methyl β-(4′-hydroxy-3′,5′-di-tert.-butyl-phenyl)-propionate.
* * * * *

UNITED STATES PATENT AND TRADEMARK OFFICE
CERTIFICATE OF CORRECTION

PATENT NO. : 4,526,944

DATED : July 2, 1985

INVENTOR(S) : Gerhard Staiger

It is certified that error appears in the above-identified patent and that said Letters Patent is hereby corrected as shown below:

Claim 1, column 6, line 34, delete "ti".

Signed and Sealed this

Eighth Day of October 1985

[SEAL]

Attest:

Attesting Officer

DONALD J. QUIGG

Commissioner of Patents and Trademarks—Designate